June 3, 1958 L. D. VAN VALKENBURGH 2,837,738
PASSIVE RANGE MEASURING DEVICE
Filed Aug. 10, 1955 5 Sheets-Sheet 1

INVENTOR.
LESTER D. VAN VALKENBURGH his ATTORNEYS.

FIG. 3.

June 3, 1958  L. D. VAN VALKENBURGH  2,837,738
PASSIVE RANGE MEASURING DEVICE
Filed Aug. 10, 1955  5 Sheets-Sheet 3

INVENTOR.
LESTER D. VAN VALKENBURGH
BY
Campbell, Brumbaugh, Free & Graves
his ATTORNEYS.

L. D. VAN VALKENBURGH 2,837,738

PASSIVE RANGE MEASURING DEVICE

Filed Aug. 10, 1955

INVENTOR.
LESTER D. VAN VALKENBURGH
BY
Campbell, Brumbaugh, Free & Graves
his ATTORNEYS.

United States Patent Office 2,837,738
Patented June 3, 1958

2,837,738
PASSIVE RANGE MEASURING DEVICE

Lester D. van Valkenburgh, Seaford, N. Y., assignor to Fairchild Engine and Airplane Corporation, Hagerstown, Md., a corporation of Maryland Application August 10, 1955, Serial No. 527,557

15 Claims. (Cl. 343—112)

This invention relates generally to a system for and method of distance determination by means of radiant energy such as acoustic, electromagnetic or other waves, based on the principle of observing both a signal received directly from one point in space and the reflection of said signal from another surface.

More particularly, the invention is concerned with distance determination between two points, a first one of which is emitting radiant energy but whose position is unknown and the other of which is observing the radiations in an effort to determine the position of the first point. For example, in the case of two aircraft in flight, one aircraft may observe electromagnetic radiation emitted for any purpose by a second aircraft, and may determine the distance to the second aircraft by measuring the relative time of arrival of the direct signal and the signal reflected from the ground.

According to a known method for measuring the distance from one aircraft to another, the one aircraft transmits electromagnetic energy toward the second aircraft, and measures the time of arrival of an echo signal reflected back from the second aircraft. In radar systems of this type, the effective range is limited by the strength of the echo signal. In addition, the searching aircraft, in radiating electromagnetic energy, unavoidably discloses his presence to the aircraft being located.

According to another known method of determining the distance between two aircraft in flight, one aircraft transmits a continuous wave radio signal which is varied sinusoidally or linearly in frequency, and which is re-ceived and re-transmitted by the second aircraft, whereby the first aircraft determines the distance by observation of the beat frequency between transmitted and reflected signals. In a system of this type, cooperation is required between the two aircraft, and the transmitted signal must have pre-arranged special characteristics to permit such distance determination.

In accordance with the present invention, means are provided, whereby one aircraft in flight, can determine the distance to a second aircraft in flight without recourse to specially designed cooperative transmitting and receiving means and without disclosing its presence to the second aircraft, provided only that the second aircraft be transmitting a distinctive radio or radar signal such as is commonly used for purposes such as radar detection, navigation, altitude determination and the like.

More particularly, the invention involves the reception by one aircraft of incidental electromagnetic radiations from a second aircraft, the measurement of the time interval between the reception of the direct signal and the signal reflected from the ground, and the computation of the distance based on this time interval and other observable geometrical quantities.

For a more complete understanding of the invention, reference may be had to the following detailed description taken with reference to the accompanying figures of the drawings forming part of this specification, wherein.

Figure 1:
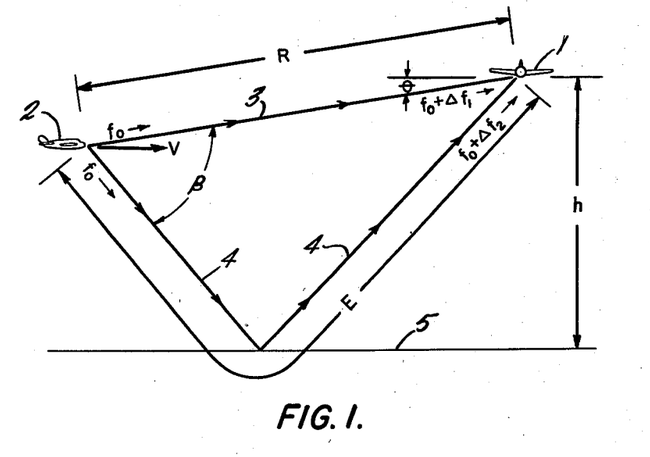
Figure 1 is a diagram representing the relations between two aircraft, the ground, and the direct and reflected paths of electromagnetic energy.

Referring to the drawings, Fig. 1 represents two aircraft in flight, wherein aircraft 2 is transmitting electromagnetic energy, and aircraft 1 is observing said electromagnetic energy. The electromagnetic energy will travel via path 3 directly from the transmitter 2 to the receiver 1, and will additionally be reflected from the ground 5 and be received by the receiver 1 via the path 4. The reflected path 4 is longer than path 3, so that the energy transmitted at some instant $t_0$ will arrive at the receiver 1 at two later instants, $t_1$ for the direct path R and $t_2$ for the reflected path E.

According to known laws concerning the velocity of propagation of electromagnetic energy, the following relations will hold:

$$t_1 - t_0 = R/V_p \qquad (1)$$

and $$t_2 - t_0 = E/V_p \qquad (2)$$

whence $$t_2 - t_1 = \frac{E-R}{V_p} \qquad (3)$$

where R and E are the physical lengths of the two paths, and $V_p$ is the velocity of propagation of the electromagnetic energy.

By the application of well known trigonometric relations, knowing the time interval $\Delta t = t_2 - t_1$, the elevation angle $\theta$ of the second aircraft 2 as measured from the first aircraft 1, and the altitude $h$ of the first aircraft 1, the distance R may be computed by the formula $$R = \frac{4h^2 - (\Delta t V_p)^2}{2\Delta t V_p - 4h \sin \theta}(\theta \text{ positive upward}) \qquad (4)$$

Figure 2:
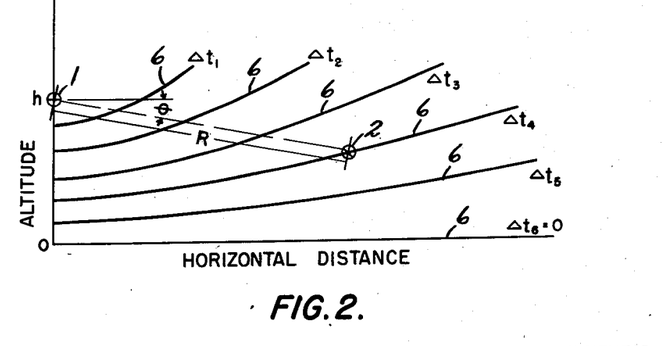
Fig. 2 is a diagram showing by graphical representation the relationships between relative location of two aircraft and the time interval between direct and reflected signals.

Figure 2 shows generally the relationship between the geometrical factors of elevation angle, range, and altitude, and the time interval $\Delta t$. The lines 6 of constant $\Delta t$ define the loci of the transmitting aircraft 2 with respect to the receiving aircraft 1 for any given value of $\Delta t$, and for a particular altitude $h$. It is seen that for accurate determination of the distance R, it is necessary to measure the elevation angle $\theta$ and the altitude $h$. It is also seen that measurement of $\Delta t$ and $h$ will provide an indication of the relative proximity of aircraft 2 to aircraft 1, as being on a particular one of these loci, without requiring measurement of the elevation angle $\theta$.

It is evident that a transmitter at ground level generally will not have a reflected path which is markedly different in length from the direct path, and therefore will display no appreciable echo interval. This characteristic may be used to identify ground radar transmitters as distinguished from airborne transmitters. However, it will be recognized that ground transmitters positioned on high cliffs or mountains may have the same characteristics as airborne transmitters.

In a further application of the principle of this invention, it is possible to measure the velocity of approach of the transmitting source to the receiving system. As is well known, a signal transmitted at one frequency will be received at a different frequency if the range between transmitter and receiver is changing.

Referring to Fig. 1, if the transmitted frequency is $f_0$, the apparent frequency of the direct signal will be $f_0+\Delta f_1$, where $\Delta f_1$ is the so-called Doppler shift due to relative velocity $dR/dt$ between transmitter and receiver, and is equal to $$\left(f_0 \times \frac{\text{closing speed}}{\text{speed of electromagnetic propagation}}\right)$$

Similarly, the apparent frequency of the ground echo signal will be $f_0+\Delta f_2$, where $\Delta f_2$ is determined by the rate of change of the echo path length $dE/dt$. The receiver will then be receiving frequencies $f_0+\Delta f_1$ and $f_0+\Delta f_2$, and the difference frequency will be $\Delta f_1 - \Delta f_2$. This beat frequency will be proportional to $dR/dt - dE/dt$. It may be noted that this explanation assumes that the transmitted frequency $f_0$ is constant, since the beat frequency is derived from signals which are received simultaneously but, due to the difference in path lengths, were transmitted at different times. Thus, the beat frequency will also be affected by any change in transmitted frequency over the time interval $\Delta t$, and it is necessary that this change be known or observed to permit the exact calculation of $dR/dt - dE/dt$. One method of accomplishing this is shown later.

The quantity which will generally be of interest is the range closure rate, $dR/dt$. This may be derived from the observed difference frequency and other observable quantities, illustrated in Fig. 1.

In this figure, the velocity of the transmitting aircraft 2 relative to the receiving aircraft 1 is shown as the vector V. Having determined the range R, the angle $\theta$, and the altitude $h$, by practice of the invention as previously described, the angle $\beta$ may be determined by known trigonometric relationships, whence:

$$\beta = \sin^{-1} \frac{2h \cos \theta}{R + V_p \Delta t} \tag{5}$$

Where R, V and $\Delta t$ are as defined in Relations 3 and 4, then $$\frac{dR}{dt} = \frac{V_p(\Delta f_1 - \Delta f_2) + R\frac{d\theta}{dt} \sin \beta}{1 - \cos \beta} \tag{6}$$

It is noted that the quantity $d\theta/dt$, the rate of change of elevation angle, must also be measured, as by differentiation of the angle $\theta$. It will be sufficient in many applications, to calculate $dR/dt$ only when $d\theta/dt$ is observed to be negligibly small, since a large value of $d\theta/dt$ indicates that the aircraft are not presently on a collision course. In such cases, the formula than reduces to:

$$\frac{dR}{dt} = \frac{V_p(\Delta f_1 - \Delta f_2)}{1 - \cos \beta} \tag{7}$$

In all cases where the beat frequency is used as described to determine the relative velocity between transmitter and receiver, there will be an ambiguity of indication in that the same beat frequency will be obtained if the relative velocity is positive (approaching) or negative (receding). However, this ambiguity may be resolved by observation of the range indication, which will provide the necessary velocity sense indication according to whether the indicated range is decreasing or increasing.

It is understood that the electromagnetic radiation which is used as a basis for this system of distance and/or velocity measurement must have some characteristic time variant quality which will permit identification of corresponding points on the direct and reflected signals, and measurement of the time interval between reception of these points. This time variant quality, or modulation, may be pulse modulation, frequency modulation, amplitude modulation or any other suitable type.

It is further required that the modulation be characterized by a periodicity or a distinguishable variation with time which is compatible with the following broad requirements:

(1) The period of a repetitive modulation such as pulse modulation should be longer than the possible time interval between direct and reflected signals, to prevent range ambiguity due to false pairing of direct and reflected pulses.

(2) The character of the modulation must be such that the time interval is measurable with acceptable accuracy. For example, a continuous wave signal modulated at an audio frequency of 100 cycles would have a distinguishable period of 10,000 microseconds. The order of magnitude of echo time delays in a useful range of aircraft altitudes and distances ranges from 10 to 100 microseconds, or 1/1000 to 1/100 of the period of the modulation. With conventional techniques, it would be impractical to detect a phase difference this small.

Within these broad limits, there is a wide variety of airborne electromagnetic transmissions which might be used in this application, including transmission by radar equipment, radio altimeters, navigational aids and the like. It is apparent that receiving equipment may be designed to receive any of the aforementioned or other types of transmissions, and the ground echo thereof, and that elevation angle measurements and time delay measurements of many different types may be used to practice the principle of this invention in conjunction with the reception of these signals.

Figure 3:
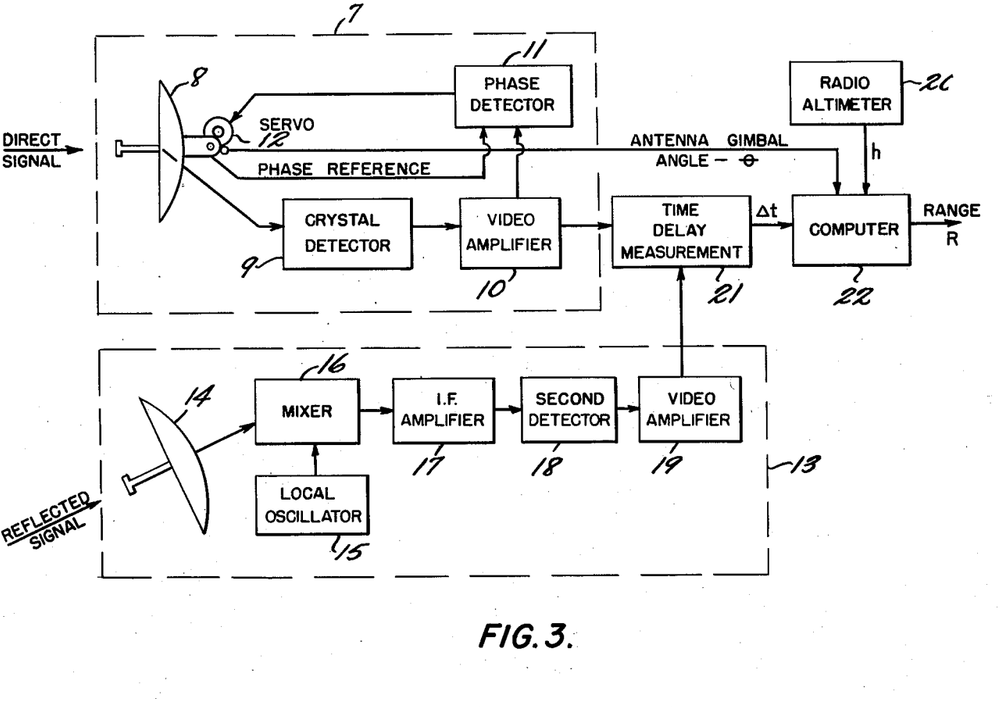
Fig. 3 is a block diagram showing a basic pulse type distance measuring system in accordance with one embodiment of the invention.

The system of Fig. 3 is suitable for use in measuring the distance to an airborne pulse type radar such as may be used for navigational purposes or for aircraft detection and tracking. Radars of this type in common use are characterized by the following operating characteristics: Radio frequencies in S-band or X-band (about 3000 megacycles or 10,000 megacycles), pulse lengths of ¼ microsecond to 4 microseconds, and pulse repetition rates of 500 p. p. s. to 2000 p. p. s.

The receiver 7 is adapted to receive the relatively strong direct pulse signals and measure the direction of their arrival. It is equipped with an antenna 8 of the type commonly used in tracking radars, known as a conically scanning antenna as described in Radiation Laboratory Series, volume 26 "Radar Scanners and Radomes," section 2.17. The antenna is mounted on a system of gimbals and is equipped with servo motors 12 to aim the antenna directionally. The receiver 7 may be of the crystal video type, as described in Radiation Laboratory Series, volume 23 "Microwave Receivers," chapter 19, embodying a crystal detector 9 which converts the incoming radio frequency pulses directly into video pulses and a video amplifier 10 for amplifying these pulses. A phase detector 11 compares the sinusoidal modulation of the envelope of these pulses from the amplifier 10 with a phase reference signal derived from the conical scanning motion of the antenna, yielding up-down and right-left error signals. The antenna gimbal servos 12 aim the antenna 8 in response to these error signals.

The useful output of the receiver 7 consists of amplified video pulses corresponding to the received direct signal pulses, and the elevation angle of the radar transmitter as derived from the antenna gimbal angle by conventional means.

The receiver 13 is adapted to receive the weaker ground echo signals. It embodies the antenna 14, which may be so designed as to have a directional receiving pattern favoring the ground echo, and a conventional superheterodyne radar receiver consisting of a local oscillator 15, a mixer 16, an I. F. amplifier 17, a second detector 18 and a video amplifier 19. This receiver is capable of receiving pulse type signals in the frequency band of interest, and may be tuned to the exact frequency by variation of the local oscillator frequency in a conventional manner.

The useful output of this receiver 13 consists of amplified video pulses corresponding to the received ground echo pulses.

Altitude information may be derived from any suitable means, such as a conventional radio or radar type altimeter 20, which yields an electrical voltage corresponding to the height of the received aircraft above the terrain.

Figure 4:
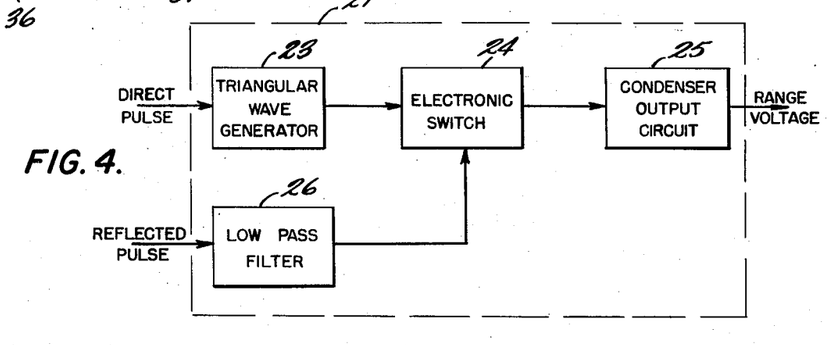
Fig. 4 is a block diagram illustrative of one form of practical embodiment of the time delay measuring portion of the system of Fig. 3.

The video pulse outputs of receivers 7 and 13 are fed into the timing device 21. This device measures the interval between the direct pulse and the succeeding ground echo, and provides an output voltage proportional to this interval. This device may take any suitable form such as that described in the Radiation Laboratory Series, volume 19, "Waveforms" in section 14.7 and Figure 14.41. Referring to Fig. 4, an exemplary embodiment of the device 21 consists of a sawtooth wave generator 23 whose operation is initiated by the direct pulse derived from the receiver 7, an electronic switch 24 which samples the voltage of this sawtooth wave at the time of arrival of the reflected pulse derived from receiver 13, and a condenser output circuit 25, which maintains this voltage until the next cycle. The selectivity of this simplified device may be improved by passing the ground echo signal input through an integrator or low pass filter network 26 which will prevent noise and short pulses from operating the switch, but will pass the ground echo, which is of relatively longer duration compared to the direct pulse or other interfering signals.

The computer 22, which may take any suitable conventional form in accordance with conventional computing techniques, accepts the inputs from the timing device, the altimeter and the antenna gimbal angle corresponding respectively to the quantities $\Delta t$, $h$ and $\theta$ in Equation 4.

Figure 5:
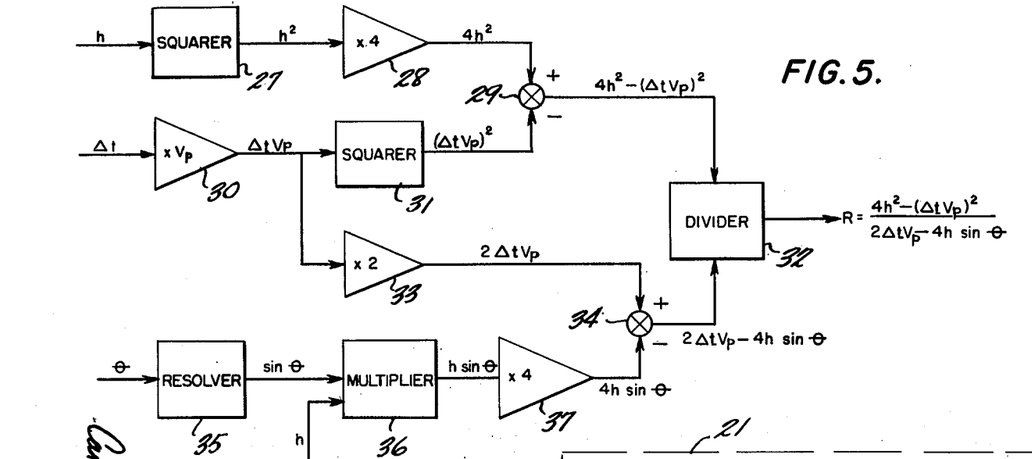
Fig. 5 is a block diagram illustrative of a computer for use with the system of Fig. 3.

Figure 5 illustrates schematically the various arithmetical operations which are performed by the computer 22, wherein each element or block represents a conventional computing element or circuit. The output of this computer is the solution of the range Equation 4.

More particularly, the output $h$ of the altimeter 20 is fed through the squaring unit 27 and the multiplier unit 28, where $h^2$ is multiplied by a factor of 4, to the adder unit 29. The output $\Delta t$ of the time delay measurement unit 21 is fed through the multiplier unit 30, where it is multiplied by the constant, $V_p$, and the squaring unit 31, and is then subtractively fed to the adder unit 29. The output of the adder unit 29 is in turn fed to the numerator input of the divider unit 32.

The output $\Delta t$ $V_p$ of the multiplier unit 30 is also fed to a multiplier unit 33, where the quantity is multiplied by a factor of 2, the resultant quantity $2\Delta t$ $V_p$ being additively fed to the adder unit 34. A quantity representative of the angle $\theta$ is fed to a resolver unit 35, the output of which is representative of sin $\theta$. A multiplier unit 36 then multiplies sin $\theta$ by $h$. The output of multiplier 36 is fed through multiplier unit 37, which multiplies by the factor 4, and the resultant quantity is subtractively fed to the adder 34. The output of the adder unit 34 is then fed to the denominator input of the divider unit 32, the output of which is representative of the quantity R, the range to the unknown transmitter.

Figure 6:
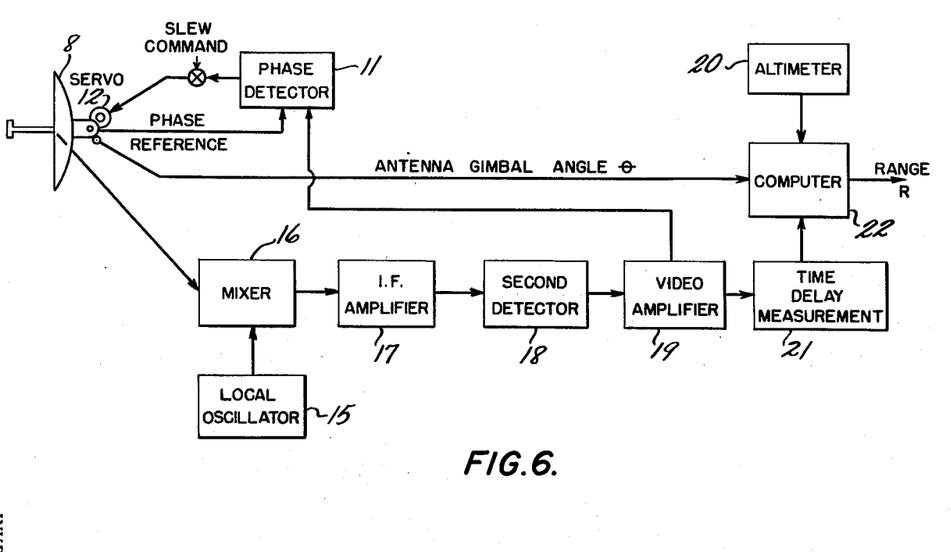
Fig. 6 is a block diagram showing another embodiment of a distance measuring system using a single receiver, in accordance with the invention.

In accordance with another embodiment of the invention, the direct and reflected signals may be received by a single antenna and receiver system. Such an alternative system is illustrated in Fig. 6. The components are same as those identified by the same number in Fig. 3. The antenna 8 is first directed at the transmitter and the elevational angle $\theta$ of the transmitter is measured. This angle is set manually into the computer 22, and then the antenna 8 is depressed by a slew command to favor the ground echo signal, while still receiving the relatively strong direct signal. The video output of the receiver then contains both direct and echo pulses, and is used to calculate the time interval as before.

As was previously explained, the received signals will also be subject to a differential shift in frequency. With a pulse type signal, there is no possibility of directly observing a beat frequency between the direct and reflected signals since they are not received simultaneously. Hence, the closing velocity cannot be determined directly as described. However, the principle may still be used by the provision of additional means for measuring the frequencies of individual pulses with sufficient accuracy to permit a determination of the relatively small frequency difference existing between the direct pulse and the subsequent echo. Alternatively, the direct pulse and the echo pulse may each be stored as they arrive in a device which sustains an oscillation at the frequency of the input pulse, and then observing the beat frequency between the sustained oscillations representing the direct and reflected pulse frequencies. Such a device is described in Radiation Laboratory Series, volume 23, "Microwave Receivers," section 21.8. Alternatively a delay line type storage technique could be used.

The method and systems above described are especially suited to measurement of the distance to a pulse type radar. Alternatively, the principle of the invention can be used to measure the distance to other types of time variant airborne sources of electromagnetic radiations. Such a source might be an airborne radar transmitting frequency modulated continuous wave energy. In this type of radar, the frequency of the transmitted signal is varied periodically according to a desirable schedule, which might consist of a linear variation about a mean value as shown by the sawtooth line 40 in Fig. 7. Through examination of the frequency of any received echo, such a radar is made to indicate the range of the object which causes the echo by various means which have been described in the prior art.

If such a radar be observed in accordance with the principle of the present invention, wherein the direct signal and the ground reflected signal are both received and compared, the received frequencies will be affected not only by the lengths of the respective paths, but by the aircraft velocities, as previously described.

Figure 7:
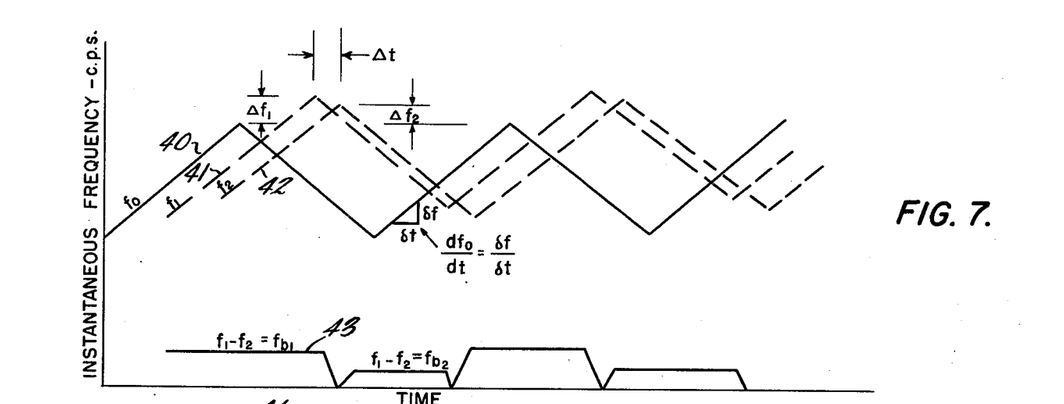
Fig. 7 is a diagram explanatory of one form of continuous wave transmission usuable in distance and speed determination, in accordance with the invention.

The effect of this phenomenon on the received signals is illustrated in Figure 7. The original frequency $f_0$ is received as $f_1$ and $f_2$ over the direct and reflected paths respectively, as illustrated by lines 41 and 42. The difference in path lengths has caused the time displacement $\Delta t$ of $f_1$ and $f_2$, while the Doppler effect has caused frequency displacements $\Delta f_1$ and $\Delta f_2$ respectively.

In general, the frequency shifts $\Delta f_1$ and $\Delta f_2$ are not equal, since the rates of change of length of the direct path and reflected path are not equal. If, therefore, the frequencies $f_1$ and $f_2$ are received and a beat frequency is measured in accordance with the known principle of such devices, this beat frequency will alternate between two values as shown by line 43 in Fig. 7.

Referring to Fig. 7, it is seen that the difference between $f_1$ and $f_2$ at any instant is determined by the total contribution due to the time shift $\Delta t$ and the frequency shift $\Delta f_1 - \Delta f_2$. The time shift $\Delta t$ causes a difference $\Delta t (df_0/dt)$, which corresponds to the amount by which the transmitted frequency changed between transmission of the signal received via the ground reflected path and that received (at the same instant) via the direct path. This difference alternates in sign as the transmitted frequency alternately increases and decreases.

The frequency shift $\Delta f_1 - \Delta f_2$ is constant in sign, since the Doppler shift is the same whether $f_0$ is increasing or decreasing. The total frequency difference between $f_1$ and $f_2$ is then:

$$f_1 - f_2 = (\Delta f_1 - \Delta f_2) \pm \Delta t (df_0/dt) \qquad (8)$$

If the successive beat frequencies $(f_1 - f_2)$ are identified as $f_{b_1}$ and $f_{b_2}$, $$f_{b_1} = (\Delta f_1 - \Delta f_2) + K\Delta t \qquad (9)$$

and $$f_{b_2} = (\Delta f_1 - \Delta f_2) - K\Delta t \qquad (10)$$

where $K$ is the constant numerical value of $$\frac{df_0}{dt}$$

The component $(\Delta f_1 - \Delta f_2)$ varies with the transmitted frequency $f_0$, being a constant percentage of $f_0$ rather than a constant frequency difference. However, the total change in the frequency $f_0$ and hence in the component $(\Delta f_1 - \Delta f_2)$ is ordinarily only a few percent of the mean value, so that for practical purposes, it may be considered constant over each half cycle of the diagram.

The difference between $f_{b_1}$ and $f_{b_2}$ is:

$$(f_{b_1} - f_{b_2}) = (\Delta f_1 - \Delta f_2) + K\Delta t - (\Delta f_1 - \Delta f_2) + K\Delta t = 2K\Delta t \qquad (11)$$

While the average of $f_{b_1}$ and $f_{b_2}$ is:

$$\frac{f_{b_1} + f_{b_2}}{2} = \frac{(\Delta f_1 - \Delta f_2) + K\Delta t + (\Delta f_1 - \Delta f_2) - K\Delta t}{2} = \Delta f_1 - \Delta f_2 \qquad (12)$$

It is seen that the difference $f_{b_1} - f_{b_2}$, is indicative of the time delay $\Delta t$, which time delay is a function of the path lengths. Likewise, the average, $$\frac{f_{b_1} + f_{b_2}}{2}$$

is indicative of the differential Doppler shift, which is a function of the relative rates of change of the path lengths.

If the difference frequency and average frequency are extracted from the alternating beat frequency $f_{b_1}$ and $f_{b_2}$, they may be used directly to determine $\Delta t$ and $f_1 - f_2$, from which the range and range rate may be calculated as previously described.

Referring to Fig. 7, it is seen that there is a possible ambiguity of interpretation of the beat frequencies $f_{b_1}$ and $f_{b_2}$, since the same beat frequencies will be observed whether $f_1$ is greater or less than $f_2$. Thus, the frequency and time shifts illustrated may be in such a sense and degree that the frequency $f_1$ is always greater than $f_2$, in which case the meaning of the average and difference frequencies as presented in Equations 11 and 12 will be incorrect.

More particularly, in the interval when $f_{b_2}$ is being received, it may be seen that there are two possible cases. In Case I, which is illustrated, $f_2 > f_1$ in that interval, and therefore $f_1 - f_2$ is negative. In Case II, not illustrated, $f_1 > f_2$ in the $f_{b_2}$ interval, and therefore $f_1 - f_2$ is positive. For Case II, then, the pertinent equations are derived from Equations 11 and 12 (which represent Case I) merely by reversing the sign of $f_{b_2}$, whence:

$$\begin{array}{l} f_{b_1} + f_{b_2} = 2K\Delta t \qquad (13) \\ \dfrac{f_{b_1} - f_{b_2}}{2} = (\Delta f_1 - \Delta f_2) \qquad (14) \end{array} \quad \text{Case II}$$

Assuming that the system embodies devices for extracting the difference frequency and the average frequency, and identifying these as device D and device A, respectively, the following table illustrates the physical transposition required:

| Case | Device | Output of Device | Multiplier | Yields |
|---|---|---|---|---|
| I | D | $f_{b_1} - f_{b_2}$ | ½ | $K\Delta t$ |
| I | A | $(f_{b_1} + f_{b_2})/2$ | 1 | $\Delta f_1 - \Delta f_2$ |
| II | D | $f_{b_1} - f_{b_2}$ | ½ | $\Delta f_1 - \Delta f_2$ |
| II | A | $(f_{b_1} + f_{b_2})/2$ | 1 | $K\Delta t$ |

Thus, the outputs of devices D and A can be used interchangeably as inputs to the range and range rate computers depending on whether Case I or Case II exists.

It is of course necessary to detect the conditions which determine whether Case I or Case II exists, so that the desired transposition can be effected. The criterion will be whether or not the beat frequency goes through zero in the transition between $f_{b_1}$ and $f_{b_2}$.

If the schedule of variation of the transmitted signal is known, a priori, the calibration of beat frequency versus time delay may be made a fixed part of the device which computes time delay $\Delta t$ as a function of the difference frequency $f_{b_1} - f_{b_2}$. If this schedule is not known in advance, it may be observed at the time of the distance measurement by means which will be described later, and used to calibrate the computer.

Figure 8:
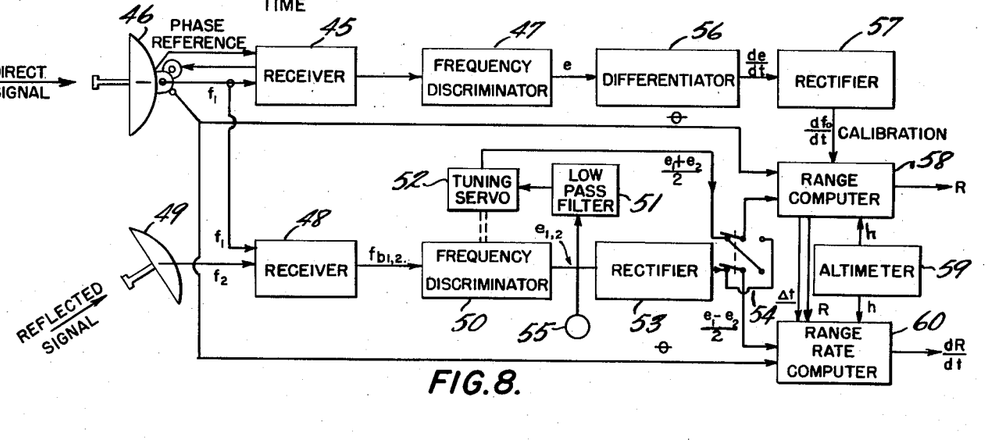
Fig. 8 is a block diagram showing an exemplary form of continuous wave system for measuring distance and velocity, in accordance with the invention.

Referring to Fig. 8, there is shown a block diagram of a system for measuring the distance and relative velocity of a frequency modulated continuous wave radar, illustrating one means for accomplishing the various functions previously described.

The receiver 45 and antenna 46, are adapted to receive the relatively strong direct signal and measure the elevation angle of the transmitter. This receiver 45 may include a conventional superheterodyne circuit which converts the received frequency $f_1$ to a lower intermediate frequency suitable for analysis by the following frequency discriminator 47. It also includes a phase detector which converts the amplitude modulation of the converted signal, due to the conical scan, into error angle information for aiming the antenna 46.

Receiver 48 and antenna 49 are adapted to receive the weaker ground echo signal. The direct signal from the antenna 46 is suitably attenuated to match the strength of the reflected signal and is mixed with the reflected signal in receiver 48. Of course, some of the direct signal will also be picked up by the antenna 49. The receiver 48 may also be a conventional superheterodyne receiver which combines the frequencies $f_1$ and $f_2$ and detects and amplifies the beat frequency. Therefore, the output of this receiver 48 will consist of the alternating beat frequencies $f_{b_1}$ and $f_{b_2}$ as illustrated in Fig. 7.

The output of this receiver is applied to a frequency discriminator 50 which converts the beat frequencies $f_{b_1}$ and $f_{b_2}$ to voltages $e_1$ and $e_2$ respectively. The frequency discriminator is adjustable so that the center frequency, or frequency for zero voltage output, may be varied to achieve equal deviation of $f_{b_1}$ and $f_{b_2}$ on each side of the center frequency.

This is accomplished by applying the discriminator output voltage $e_1$, $e_2$ to a low pass filter 51 which averages the square wave voltage to the D.-C. voltage $(e_1 + e_2)/2$. This D.-C. voltage drives a suitable servo 52 which positions the frequency responsive element of the discriminator in such a sense as to decrease the average output of the discriminator. The null position of this loop will then correspond to $(e_1 + e_2)/2 = 0$, and the center frequency $f_c$ of the discriminator will then be the average of $f_{b_1}$ and $f_{b_2}$.

When the discriminator is balanced at $(e_1 + e_2)/2 = 0$, the output will be a square wave with a peak-to-peak amplitude equal to $e_1 - e_2$, or a deviation of $(e_1 - e_2)/2$ from zero. This alternating voltage is applied to a rectifier 53 whose output is a D.-C. voltage $(e_1 - e_2)/2$.

It may be seen, then, that the requirements for determination of the average frequency and difference frequency as previously shown to be necessary, are satisfied by this system. The average frequency is derived from the position of the servo device 52 which tunes the discriminator, and the difference frequency is derived from the rectifier 53.

As previously indicated, it is necessary that the outputs of these devices be interchangeable to provide for the alternate case in which $f_1$ is always greater than $f_2$. This may be accomplished by the double-pole-double-throw switch 54.

Identification of the conditions calling for one or the other of these alternates may be accomplished by monitoring the output of the frequency discriminator on a peak reading voltmeter 55. If the beat frequency changes from $f_{b_1}$ to $f_{b_2}$ without going through zero frequency (Case II) the frequency discriminator output will go from plus to minus $(e_1-e_2)/2$, passing through zero. If the beat frequency goes through zero, the frequency discriminator output will have transient peaks corresponding to the peak of the discriminator curve, as the frequency decreases and increases through the low-frequency arm of this curve. Comparison of the peak voltage with the value $(e_1-e_2)/2$ will then disclose which case exists; in Case I, the peak voltage will be markedly greater than $(e_1-e_2)/2$, while in Case II, they will be essentially equal.

Finally, provision is made to observe the rate of change of the transmitted frequency $f_0$, so that the correct calibration of time interval $\Delta t$ versus average beat frequency $f_{b_1}+f_{b_2}/2$ may be accomplished. This is accomplished by applying the output of receiver 45 consisting of the varying frequency $f_1$, to a circuit comprising the frequency discriminataor 47, a differentiating circuit 56, and a rectifier 57, yielding an output voltage proportional to the time rate of change, $df_0/dt$, of the transmitted frequency $f_0$. This voltage may be used to establish the required calibration of average beat frequency versus time delay in the range computer 58.

The remainder of the system consists of the altimeter 59 and the computing elements 58 and 60 which are of suitable form to solve the Equations 4, 5, 7, 11 and 12 to obtain the range and range closure rates.

Thus there has been provided, in accordance with the invention, novel methods and systems for the passive measurement of range and range closure rates between a measuring point and a point from which acoustic or electromagnetic radiations are being transmitted, without the need of transmission of acoustic or electromagnetic radiations from the measuring point.

It will be understood that the above described embodiments are meant to be merely exemplary and that they are susceptible of wide variation and modification without departing from the spirit and scope of the invention. For example, the altitude of the receiving aircraft could be determined by an aneroid type altimeter, with correction for the known elevation of the terrain above sea level. Further, the timing device could be designed for automatic tracking of the selected ground echo to the exclusion of interfering signals from other transmitters or their ground echos, by any of several means which are well known in the radar field, several of which are published in the Radiation Laboratory Series, volume 20, "Electronic time measurements."

In another possible system, the timing device could be replaced by an oscilloscope so connected that the horizontal sweep is triggered by the strong direct pulse, as is commonly effected in oscilloscope techniques, with the direct and echo pulses appearing as vertical deflections of the oscilloscope trace. The time delay is then measured by an observer on a calibrated scale along the horizontal axis of the oscilloscope.

In yet another system, the formula for range is solved manually by an observer or by reference to a chart of range versus time delay, altitude, and elevational angle.

Still further, there are many possible variations in the components and circuits which may be utilized in the practice of this invention. In particular, the field of radar design offers many techniques for analysis of the frequency, phase, or time modulation of reflected electromagnetic radiation which might be utilized to advantage in particular applications of this invention. Also the principles of the invention are equally apposite to the application of well known acoustic techniques. Therefore, the invention is not deemed to be limited except as defined by the appended claims.

I claim:

1. A system for measuring the range between a given point and a second point at an unknown location from which detectable radiations having distinguishable characteristics are emanating, comprising means for receiving at said given point direct radiations from said second point and indirect radiations from said second point which have been reflected from a reflecting surface, means for measuring the time delay at said given point between said direct and indirect radiations, means for measuring the angle of elevation of said second point from said given point, means for indicating the altitude of said given point relative to said reflecting surface, and computing means for determining the range from said given point to said second point as a function of said time delay, said angle of elevation, and said altitude of said given point.

2. A system for passively measuring the range between a given point and a second point at an unknown location from which detectable radiations having distinguishable characteristics are emanating, comprising means for receiving at said given point direct radiations from said second point and indirect radiations from said second point which have been reflected from a reflecting surface, means for measuring the time delay at said given point between said direct and indirect radiations, means for measuring the angle of elevation of said second point from said given point, means for measuring the altitude of said given point relative to said reflecting surface, and computing means for determining the range from said given point to said second point as a function of said time delay, said angle of elevation, and said altitude of said given point.

3. A system for passively measuring the range between a given point and a second point at an unknown location from which detectable radiations having distinguishable characteristics are emanating, said given point and said second point being susceptible of relative movement therebetween, comprising means for receiving at said given point direct radiations from said second point and indirect radiations from said second point which have been reflected from a reflecting surface, means for measuring the time delay at said given point between said direct and indirect radiations, means for measuring the angle of elevation of said second point from said given point, means for measuring the altitude of said given point relative to said reflecting surface, computing means for determining the range from said given point to said second point as a function of said time delay, said angle of elevation, and said altitude of said given point, and additional computing means for determining the rate of closure from said given point to said second point.

4. A system for passively measuring the range between a given point and a second point at an unknown location from which detectable radiations having distinguishable characteristics are emanating, said given point and said second point being susceptible of relative movement therebetween, comprising means for receiving at said given point direct radiations from said second point and indirect radiations from said second point which have been reflected from a reflecting surface, means for measuring the time delay at said given point between said direct and indirect radiations, means for measuring the angle of elevation of said second point from said given point, means for measuring the altitude of said given point relative to said reflecting surface, and computing means for determining the rate of closure between said given point and said second point as a function of said time delay, said angle of elevation, and the altitude of said given point relative to said reflecting surface.

5. A system for passively measuring the range between a given point and a second point at an unknown location from which discontinuous detectable radiations having distinguishable characteristics are emanating, comprising means for receiving at said given point direct radiations from said second point and indirect radiations from said second point which have been reflected from a reflecting surface, time delay measuring means for determining the time delay at said given point between corresponding portions of said discontinuous direct and indirect radiations, means for measuring the angle of elevation of said second point from said given point, means for measuring the altitude of said given point relative to said reflecting surface, and computing means for determining the range from said given point to said second point as a function of said time delay, said angle of elevation, and said altitude of said given point.

6. A system for passively measuring the range between a given point and a second point at an unknown location from which discontinuous radiations having distinguishable characteristics are emanating, said given point and said second point being susceptible of relative movement therebetween, comprising means for receiving at said given point direct radiations from said second point and indirect radiations from said second point reflected from a reflecting surface, time delay measuring means for determining the time delay at said given point between corresponding portions of said discontinuous direct and indirect radiations, means for measuring the angle of elevation of said second point from said given point, means for measuring the altitude of said given point relative to said reflecting surface, first computing means for determining the range from said given point to said second point as a function of said time delay, said angle of elevation, and said altitude of said given point, and second computing means for determining the rate of closure between said given point and said second point.

7. A system for passively measuring the range between a given point and a second point at an unknown location from which discontinuous radiations having distinguishable characteristics are emanating, said given point and said second point being susceptible of relative movement therebetween, comprising means for receiving at said given point direct radiations from said second point and indirect radiations from said second point which have been reflected from a reflecting surface, time delay measuring means for determining the time delay at said given point between corresponding portions of said discontinuous direct and indirect radiations, means for measuring the angle of elevation of said second point from said given point, means for measuring the altitude of said given point relative to said reflecting surface, and computing means for determining the rate of closure between said given point and said second point as a function of said time delay, said angle of elevation, and said altitude of said given point.

8. A system for passively measuring the range between a given point and a second point at an unknown location from which continuous detectable radiations having distinguishable characteristics are emanating, comprising means for receiving at said given point direct radiations from said second point and indirect radiations from said second point which have been reflected from a reflecting surface, measuring means for determining the time delay at said given point between said direct and indirect radiations, means for measuring the angle of elevation of said second point from said given point, means for measuring the altitude of said given point relative to said reflecting surface, and computing means for determining the range from said given point to said second point as a function of said time delay, said angle of elevation, and said altitude of said given point.

9. A system for passively measuring the range between a given point and a second point at an unknown location from which continuous radiations having distinguishable characteristics are emanating, said given point and said second point being susceptible of relative movement therebetween, comprising means for receiving at said given point direct radiation from said second point and indirect radiations from said second point reflected from a reflecting surface, measuring means for determining the time delay at said given point between said direct and indirect radiations, means for measuring the angle of elevation of said second point from said given point, means for measuring the altitude of said given point relative to said reflecting surface, first computing means for determining the range from said given point to said second point as a function of said time delay, said angle of elevation, and said altitude of said given point, and second computing means for determining the rate of closure between said given point and said second point.

10. A system for passively measuring the range between a given point and a second point at an unknown location from which continuous radiations of distinguishable characteristics are emanating, said given point and said second point being susceptible of relative movement therebetween, comprising means for receiving at said given point direct radiations from said second point and indirect radiations from said second point reflected from a reflecting surface, measuring means for determining the time delay at said given point between said direct and indirect radiations, means for measuring the angle of elevation of said second point from said given point, means for measuring the altitude of said given point relative to said reflecting surface, and computing means for determining the rate of closure between said given point and said second point as a function of said time delay, said angle of elevation, and said altitude of said given point.

11. A system for passively measuring the range between a given point and a second point at an unknown location from which detectable radiations of continuously varying frequency are emanating, comprising means for receiving at said given point direct radiations from said second point and indirect radiations from said second point reflected from a reflecting surface, mixing means responsive to said direct and indirect received radiations of continuously varying frequency for producing a beat frequency signal representative of the time delay at said given point between said direct and indirect radiations, means for measuring the angle of elevation of said second point from said given point, means for measuring the altitude of said given point relative to said reflecting surface, and computing means for determining the range from said given point to said second point as a function of said time delay, said angle of elevation, and said altitude of said given point.

12. A system for passively measuring the range between a given point and a second point at an unknown location from which detectable radiations of continuously varying frequency are emanating, said given point and said second point being susceptible of relative movement therebetween, comprising means for receiving at said given point direct radiations from said second point and indirect radiations from said second point reflected from a reflecting surface, mixing means responsive to said received direct and indirect radiations of continuously varying frequency for producing a beat frequency signal, means for measuring the angle of elevation of said second point from said given point, means for measuring the altitude of said given point relative to said reflecting surface, first computing means for determining the range from said given point to said second point as a function of said beat frequency, said angle of elevation, and said altitude of said given point, and second computing means for determining the rate of closure between said given point and said second point.

13. A system for passively measuring the range between a given point and a second point at an unknown location from which detectable radiations of continuously varying frequency are emanating, said given point and said second point being susceptible of relative movement therebetween, comprising means for receiving at said given point direct radiations from said second point and indirect radiations from said second point reflected from a reflecting surface, mixing means responsive to said received direct and indirect radiations of continuously varying frequency for producing a beat frequency signal, means for measuring the angle of elevation of said second point from said given point, means for measuring the altitude of said given point relative to said reflecting surface, and computing means for determining the rate of closure between said given point and said second point as a function of said beat frequency signal, said angle of elevation, and said altitude of said given point.

14. A system for passively measuring the range between a given point and a second point at an unknown location from which discontinuous detectable radiations having distinguishable characteristics are emanating, comprising movable directional antenna means at said given point, means for positioning said directional antenna means so as to best receive at said given point direct radiations from said second point, circuit means coupled to said antenna means for receiving both direct radiations from said second point and indirect radiations from said second point which have been reflected from a reflecting surface, time delay measuring means for determining the time delay at said given point between corresponding portions of said discontinuous direct and indirect radiations, means responsive to the position of said directional antenna means for measuring the angle of elevation of said second point from said given point, means for measuring the altitude of said given point relative to said reflecting surface, and computing means for determining the range from said given point to said second point as a function of said time delay, said angle of elevation, and said altitude of said given point.

15. A system for passively measuring the range between a given point and a second point at an unknown location from which discontinuous detectable radiations having distinguishable characteristics are emanating, comprising first and second radiation receiving means positioned at said given point, said first radiation receiving means including directional antenna means, means for controlling the position of said directional antenna means so as to cause said directional antenna means to best receive direct radiations from said second point, and signal producing means for producing a signal in response to direct radiations received by said directional antenna means, said second radiation receiving means including second antenna means adapted to be directed so as to best receive indirect radiations from said second point which have been reflected from a reflecting surface, and signal producing means for producing a signal in response to radiations picked up by said second antenna means, time delay measuring means for determining the time delay at said given point between corresponding portions of said discontinuous direct and indirect radiations received by said first and second radiation receiving means, means for measuring the altitude of said given point relative to said reflecting surface, means responsive to the position of said directional antenna means for measuring the angle of elevation of said second point from said given point, and computing means for determining the range from said given point to said second point as a function of said time delay, said angle of elevation, and said altitude of said given point.

References Cited in the file of this patent

UNITED STATES PATENTS

| | | |
|---|---|---|
| 2,045,072 | Espenschied | June 23, 1936 |
| 2,134,535 | Runge | Oct. 31, 1938 |
| 2,413,620 | Guanella | Dec. 31, 1946 |